March 20, 1928.

H. HOUGHTON

IGNITION TESTER

Filed Jan. 13, 1925

1,663,130

INVENTOR.
Herbert Houghton,
BY
ATTORNEY.

Patented Mar. 20, 1928.

1,663,130

UNITED STATES PATENT OFFICE.

HERBERT HOUGHTON, OF LOS ANGELES, CALIFORNIA.

IGNITION TESTER.

Application filed January 13, 1925. Serial No. 2,094.

My invention relates to ignition testers for internal combustion engines and particularly pertains to a device for locating defects in spark plugs and in the wiring of the secondary circuit of such engine.

An object of my invention is to provide a means comprising separable ignition testers adapted to be employed to test the ignition and wiring of each separate cylinder of an internal combustion engine of the multi-cylinder type.

Another object is to provide a device of the above character which is adapted to be readily attached to and removed from a spark plug, and which includes a movable contact member that may be easily adjusted to various positions relative to the binding post terminal of the spark plug.

Another object is to provide means for testing motor ignition that is adapted to alternately test the secondary wires leading to the spark plug while the plugs are functioning and thereafter test the plug, and in which the means for testing the wires are separately attached to the means for testing the plug.

Another object is to provide a secondary ignition tester for vehicle engines that may be applied to test one or any number of ignition plugs of the cylinder to which they are fixed and said tester adapted to be removed or replaced while the engine is operating.

A further object is to provide a device for the purposes above set forth which is simple in construction, economical in manufacture, effective in operation and which is so formed that it may be readily applied to the various types of spark plugs now generally in use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of that which is claimed, without departing from the spirit of the invention.

Referring to the drawings:—

More specifically, 10 indicates a U-shaped standard formed of spring wire embodying an arch 11 from which extends legs 12 and 13 to which are rigidly and permanently fixed a pair of contact sectors 14 and 15 constituting opposed arcuate clamp arms that are adapted to engage portions of a spark plug 16.

Figures 3, 4:
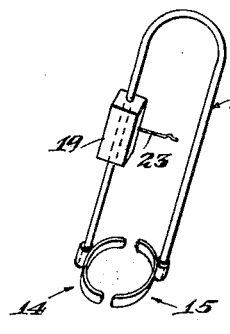
Figure 3 is a perspective view of the tester as detached.
Figures 4, 5 and 6 are perspective views of modified forms of the tester.

The clamp arms may be made with a laterally projecting connecting strip 17 which terminates in a socket 18 engaged by the legs 12 and 13 so as to space the legs of the standard outwardly of the clamps to clear projecting portions of the plug, or the clamp arms may be directly fixed to the sockets, as shown in Figure 3 where clearance is not necessary.

19 indicates a sleeve formed of insulating material, which sleeve has a bore 20 provided with a longitudinal groove 21. Midway of the ends of the sleeve a conduit 22 is drilled from the surface of the sleeve 19 to the groove 21 in the bore 20. The groove is deepened and slightly curved from the end of the sleeve to the conduit 22 to provide a seat for a relatively light spring wire serving as a test contact point 23 which wire is inserted in the bore 20 and bent so that the inner end portion thereof will extend longitudinally of the bore 20 and the end thereof normally bear on the opposite wall of the bore. The outer free end of the wire projecting from the sleeve is bent in a suitable shape (but preferably as shown) to form a projection 24 to act as a key, the purpose of which will appear hereinafter.

After the test point wire has been inserted in the sleeve the latter is forced onto one of the legs after which the sockets 18 will be secured to the ends of the standard. The sleeve will then be frictionally held and be rotatable and slidably supported on the standard and may be adjusted in relation to a spark plug terminal 25 when the standard is clamped to a spark plug 16, as shown in Figure 1.

Figure 2:
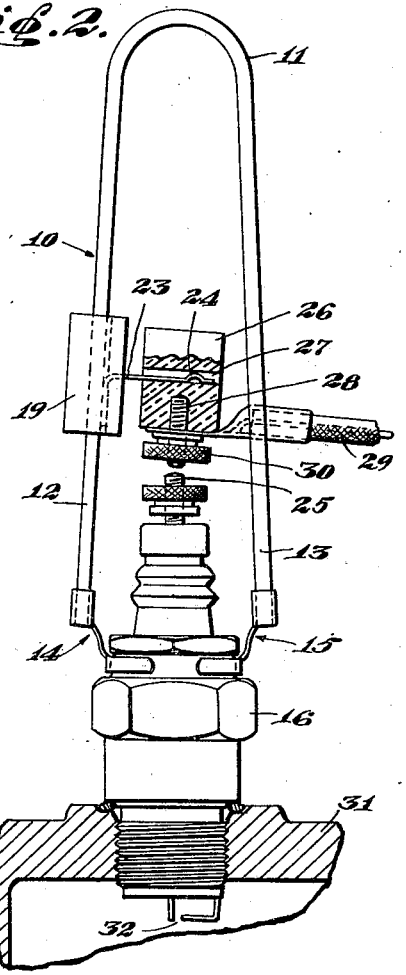
Figure 2 is a view analogous to Figure 1 and showing the ignition tester as used in testing a secondary wire of an ignition circuit in combination with a spark plug.

Referring to Figure 2, 26 indicates a block of insulation formed with a vertically elongated passage 27 running transversely therethrough, which block is adapted to be slipped onto the test point and frictionally held thereon by reason of the projection 24 which also prevents rotation of the block and whereby the block will be held in parallel relation to the sleeve 19. A terminal stud 28 provided with threads is embedded in the lower portion of the block 20 projecting downwardly when the standard is attached to a plug. The stud 28 is adapted to receive ignition wire 29 and a terminal nut 30. Thus it will be seen that the block 26 may be positioned on the test point 23 to provide a spark gap between the ignition wire 29 and the terminal 25.

Figure 1:
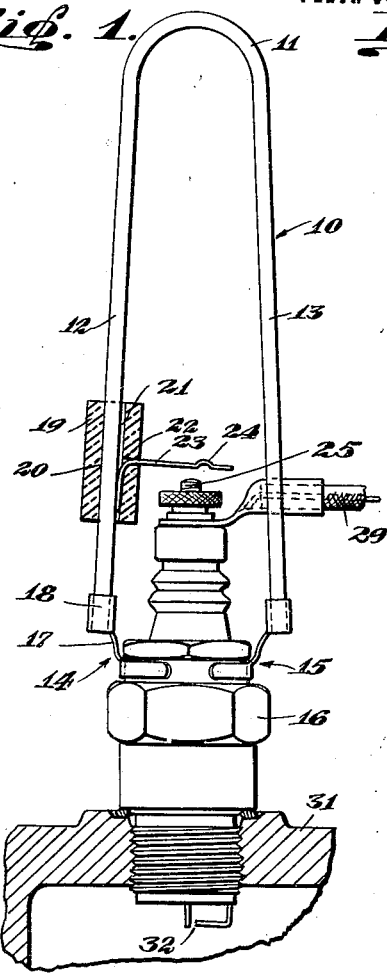
Figure 1 is a side elevational view of my ignition tester with portions broken away showing it as applied to a spark plug of an internal combustion engine.

In the arrangement shown in Figure 1, the sleeve 19 carrying the test point 23 may be positioned to short-circuit the plug 16 so that a spark gap will be provided between the terminal 25 of the plug 16 and the test point 23, to test the spark of the plug or cut the plug out of operation when testing other cylinders of an engine to which the device is attached.

Figure 5:
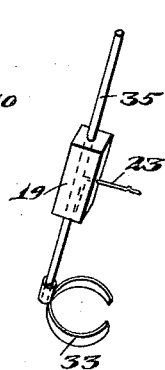

The modifications shown in Figures 4 and 5 have clamp members 33 and 34 respectively that are adapted to be clamped to a spark plug to hold the standard 35 or 36 upwardly, and that will be held to the spark plug by the spring of the clamp instead of the spring of the standard, as shown in Figure 1.

Figure 6:
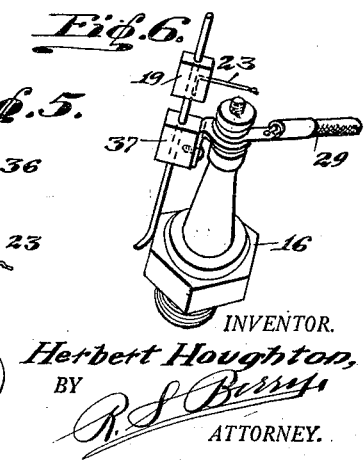

In the modification shown in Figure 6, the standard is carried in a block of insulation 37 which may be attached to a plug and is rigidly held and not dependent on spring action to engage the plug, although the standard is carried down to engage the metal portion of the plug for the same purpose as for the tester shown in Figure 1.

In practice the ignition tester is attached to a plug 16 of an engine 31 while the engine is running and the sleeve 19 is lowered so that the point 23 is brought near the terminal 25, so that the spark taking place in the plug gap 32 in an engine cylinder may be short-circuited and whereby the strength or quality of spark being made in the cylinder may be determined. In the case of multi-cylinder engines one tester is placed on each plug of the engine so that any plug or any number of plugs may be cut out at any time whereby the condition of any other plug which is firing any cylinder may be determined. After the plugs of an engine have been tested to the satisfaction of an operator the terminal wires 29 may be removed from the terminals of the plugs and attached to the terminals 28 of the blocks 26 and the blocks placed upon respective pins 23 whereupon the sleeves 19 of the several testers being used can be adjusted to bring the blocks 24 in alignment with the terminals 25 with the terminals 28 spaced such distance from the terminals 25 as to form spark gaps whereby the intensity of the sparks created by the electrical current flowing from conductors 29 to the spark plug terminals across the gaps may be determined and in event of a break or short in the conductors 29, such break or short will be indicated by the absence of a spark, or by a weak spark, between the terminals 28 and 25. Any wire or set of wires may be cut away from the plug to test the remaining wires.

I claim:—

1. In a spark plug tester, a U-shaped standard formed of spring wire, clamping arms on the ends of said wire engageable with the body portion of a spark plug to effect electrical connection between the body portion of the plug and the standard and to position the standard astride the terminal portion of the spark plug, an insulating block slidable longitudinally of and rotatably supported on one of the leg members of said standard, and a contact wire carried by said insulating block having one end portion projecting therefrom and having its other end portion slidably contacting with said standard.

2. In a spark plug tester, a U-shaped standard formed of spring wire, clamping arms on the ends of said wire engageable with the body portion of a spark plug to effect electrical connection between the body portion of the plug and the standard and to position the standard astride the terminal portion of the spark plug, an insulating block slidable longitudinally of and rotatably supported on one of the leg members of said standard, a contact wire carried by said insulating block having one end portion projecting therefrom and having its other end portion slidably contacting said standard, a second insulating block formed with a bore to receive the wire projecting from the first named insulating block, and a terminal stud and nut carried by said last named insulating block.

3. A spark plug tester comprising a standard having a limb of stiff wire, means forming a readily detachable physical connection between the standard and a spark plug and constituting an electrical connection with one of the electrodes thereof, a sleeve of insulating material carried by said limb and capable of free movements both axially and rotationally thereof, and a contact member, carried by said sleeve, having its one end in engagement with said limb and its other end projecting radially through the wall of said sleeve for relation to the other electrode of the spark plug.

In testimony whereof I affix my signature.

HERBERT HOUGHTON.